United States Patent [19]

Adomeit et al.

[11] Patent Number: 4,948,168

[45] Date of Patent: Aug. 14, 1990

[54] GAS BAG CUSHION KNEE RESTRAINING SYSTEM FOR MOTOR VEHICLES

[75] Inventors: Heinz-Dieter Adomeit, Berlin; Roland Brenner, Schwäbisch Gmünd both of Fed. Rep. of Germany

[73] Assignee: TRW Repa GmbH, Fed. Rep. of Germany

[21] Appl. No.: 329,981

[22] Filed: Mar. 29, 1989

[30] Foreign Application Priority Data

Mar. 29, 1988 [DE] Fed. Rep. of Germany ....... 3810688

[51] Int. Cl.$^5$ .................... B60R 21/045; B60R 21/16
[52] U.S. Cl. .................................. 280/732; 280/730
[58] Field of Search ............... 280/730, 732, 743, 727, 280/734, 728; 296/70; 180/90

[56] References Cited

U.S. PATENT DOCUMENTS

| | | | |
|---|---|---|---|
| 3,618,978 | 11/1971 | Klove, Jr. et al. | 280/732 |
| 3,702,706 | 11/1972 | Sobkow | 280/730 |
| 3,951,427 | 4/1976 | Wilfert | 280/732 |

FOREIGN PATENT DOCUMENTS

| | | |
|---|---|---|
| 2146258 | 3/1972 | Fed. Rep. of Germany . |
| 2248568 | 4/1974 | Fed. Rep. of Germany . |
| 260664 | 8/1977 | Fed. Rep. of Germany . |
| 2634222 | 2/1978 | Fed. Rep. of Germany . |

Examiner—Richard A. Bertsch
Attorney, Agent, or Firm—Tarolli, Sundheim & Covell

[57] ABSTRACT

A passive restraining system for vehicle occupants is presented in which the protective action of a gas bag is considerably increased by a knee cushion which is movable out of a rest position into an activated position closer to the knee of the vehicle occupant. To move the knee cushion out of its rest position into its activated position no separate drive mechanism is necessary because the energy required to do this is derived from the expansion pressure of the gas bag which is arranged in the direction of travel in front of the knee cushion and presses the latter into its activated position.

23 Claims, 12 Drawing Sheets

GAS BAG CUSHION KNEE RESTRAINING SYSTEM FOR MOTOR VEHICLES

The present invention relates to a gas bag knee cushion restraining system for motor vehicles having a gas bag inflatable by a gas generator and a knee cushion mounted in the region of the lower dashboard covering.

A gas bag inflatable automatically in an emergency situation forms a very effective passive restraining system for vehicle occupants in conjunction with a knee cushion. On the driver's side the folded-up gas bag is generally stowed in the steering wheel hub. On the front passenger's side the folded gas bag is generally accommodated in a stowing chamber which is formed at the point usually occupied by the glove compartment. The knee cushion can be formed by a reinforced portion of the lower dashboard covering. The nearer the knee cushion is to the knees of the vehicle occupant the greater the protective effect achieved. However, to avoid unacceptably retricting the freedom of movement of vehicle occupants of different sizes during travelling the knee cushion or pad must be arranged relatively far forward in the direction of travel.

Now, consideration might be given to making the knee cushion not fixed but movable into an activated position close to the knees of the vehicle occupant; the movement into the activated position would have to take place at least approximately simultaneously with the inflating of the gas bag. However, in addition to the already considerable expenditure required for providing a gas bag restraining system this would then involve a likewise considerable expenditure for an effective drive mechanism of the knee cushion.

The present invention provides a gas bag knee cushion restraining system for motor vehicles in which the contribution made by the knee cushion to the protection of the vehicle occupant is considerably increased.

This is achieved according to the invention in the gas bag knee cushion restraining system of the type mentioned at the outset, wherein the knee cushion is mounted movably and is movable out of a rest position into an activated position closer to the knees of the vehicle occupant, the energy liberated on actuating the gas generator being also used for moving the knee cushion from its rest position to its activated position. The idea underlying the invention is that a separate drive source for the movement of the knee cushion into an activated position closer to the knees of the vehicle occupant is not necessary if the energy liberated by the gas generator on actuation thereof also acts on the knee cushion to move the latter into the activated position. Particularly expedient is an embodiment in which at least part of the folded gas bag is disposed, seen in the direction of travel, in front of the knee cushion and at about the same or lesser height. When the gas bag unfolds the knee cushion is then pressed by the expansion pressure into the activated position. Also advantageous are embodiments in which the knee cushion is guided by a guide mechanism between its rest position and its activated position and the movement of the knee cushion from the rest position to the activated position is derived from the movement of the gas bag occurring on unfolding thereof via a force-locking coupling between gas bag and guide mechanism of the knee cushion.

An arrangement of a gas bag knee cushion restraining system forming a component assembly in the region of the lower dashboard covering is advantageous from two points of view: firstly, in this region there is usually adequate space for accommodating the system, in particular on the passenger's side; secondly, the folded gas bag can be arranged in the direction of travel directly in front of the knee cushion so that the expansion pressure occurring on inflation acts directly on the knee cushion to force the latter into its activated position. This construction and arrangement is distinguished by particularly low expenditure.

Further advantageous developments of the idea underlying the invention are set forth in the subsidiary claims.

Several embodiments of the invention will now be described in detail with reference to the drawings, wherein:

FIGS. 2 to 12 show corresponding schematic side view of further embodiments, a fragment viewed from a different direction being shown in each of FIGS. 2a, 6a and 9a.

Figure 1:
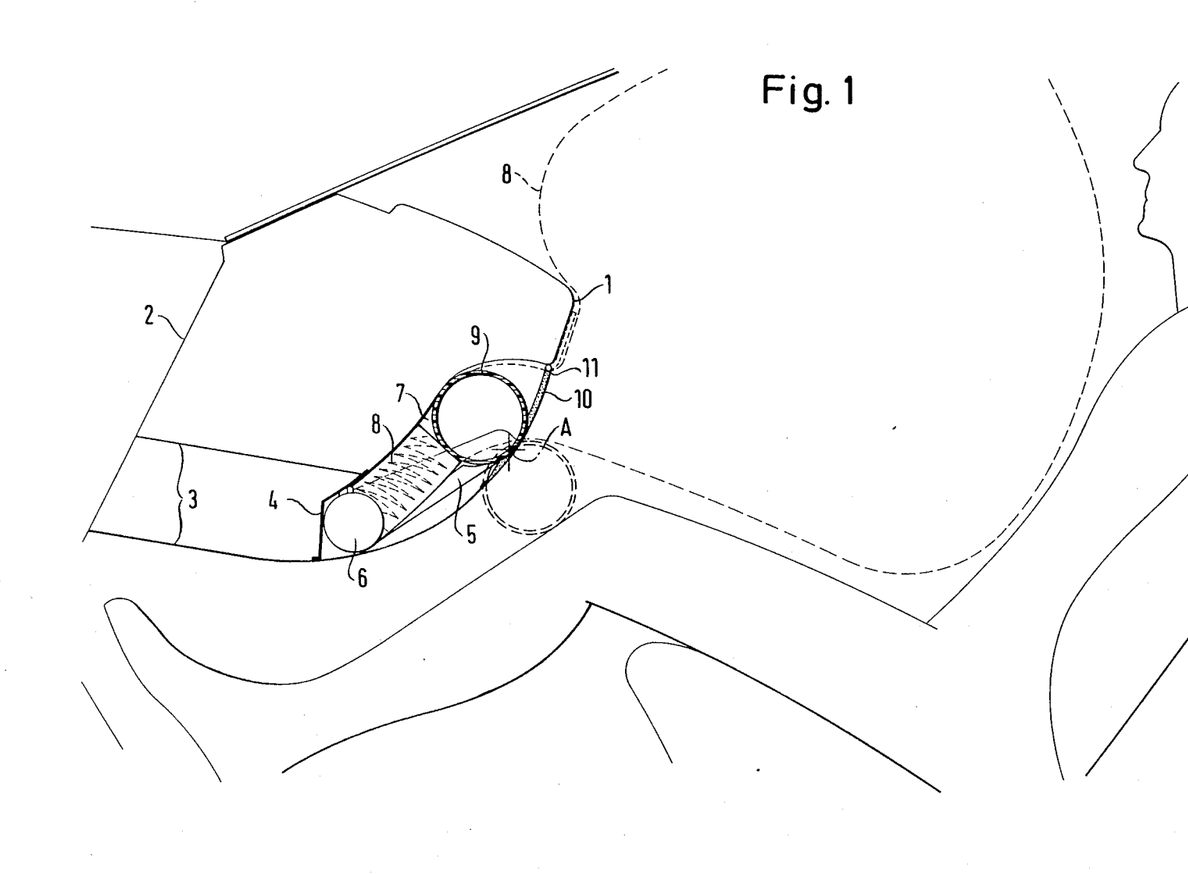
FIG. 1 is a schematic partially sectioned side view of a first embodiment of the gas bag knee cushion restraining system for motor vehicles.

FIG. 1 shows schematically the outlines of the interior of a motor vehicle and a vehicle occupant in side elevation. In the embodiment shown the restraining system is installed on the front passenger's side. At the point denoted by 1 the upper edge of the dashboard can be seen. A splashboard 2 separates the engine compartment from the interior of the vehicle. A splashboard base 3 is supported on the splashboard 2 Mounted on the splashboard base 3 is a metal support plate 4 to which a joint pedestal 5 is connected. The metal support plate 4 serves to mount a tubular gas generator 6. The metal support plate 4 forms (in the direction of travel) a front boundary for a stowing space 7 in which apart from the gas generator 6 a folded gas bag 8 and a cylindrical knee cushion or pad 9 are accommodated. The knee cushion is pivotally mounted about a shaft A connected to the joint pedestal 5. The knee cushion 9 is pivotal between a rest position shown in full lines and an activated position shown in dashed line. In the rest position the knee cushion 9 is completely accommodated in the interior of the stowing space 7. The stowing space 7 is closed towards the vehicle occupant by a cover 10 which at its upper edge 11 adjoins the portion lying thereabove of the dashboard. At its lower edge the cover 10 is connected via a tear edge to the portion therebelow of the dashboard covering. In the region of its upper edge 11 the cover 10 is made flexible to permit swinging up after severing of the tear edge. The swung-up position is shown in dashed line in FIG. 1.

In its activated position the knee cushion 9 assumes an over-deadcentre position in which it bears on the joint pedestal 5. Since the forces exerted on the activated knee support under a load are directed inclined forwardly and upwardly they tend to pivot the knee support 9 beyond its over-deadcentre position but this is prevented by the engagement on the joint pedestal 5 so that the knee cushion 9 is arrested in its activated position and transmits the load originating from the vehicle occupant via the joint pedestal 5 and the splashboard base 3 connected thereto to the splashboard 2. By suitable choice of material and dimensioning of the knee cushion 9, the joint pedestal 5 and the splashboard base 3 a deformation can be achieved which is utilized for force limitation.

No separate drive is provided for the movement of the knee cushion 9 out of its rest position into its activated position closer to the knees of the occupant. The gas bag 8 lies in the folded state beneath the knee cushion 9 accommodated in the stowing space 7. When the gas generator 6 is fired combustion gases enter the gas bag 8 which expands and first presses against the knee cushion 9 because the latter obstructs its further expansion. Since the gas pressures generated in the initial stage of the inflation operation are extremely high the gas cushion 9 is pressed suddenly out of the stowing space 7 and as a result firstly the cover 10 is detached along its tear edge from the adjacent dashboard regions and then the knee cushion 9 is pivoted clockwise in FIG. 1 until it reaches its activated position. The expansion of the gas bag 8 is guided between the inner side of the metal support plate 4 and the inside of the joint pedestal 5 because said inner faces form a guide passage. As soon as the gas bag 8 has emerged from the stowing space 7 it is completely inflated by the gases liberated by the gas generator 9, the cover 10 being swung up and thus not restricting the expansion of the gas bag 8. Thus, when the knee cushion 9 has been pivoted into its activated position the gas bag 8 can unfold freely.

In all the embodiments subsequently described the structure, arrangement and mode of operation are fundamentally the same as in the embodiment according to FIG. 1. For corresponding elements which are not described in detail again the same reference numerals as in FIG. 1 are used in FIGS. 2 to 10.

Figures 2, 2A:
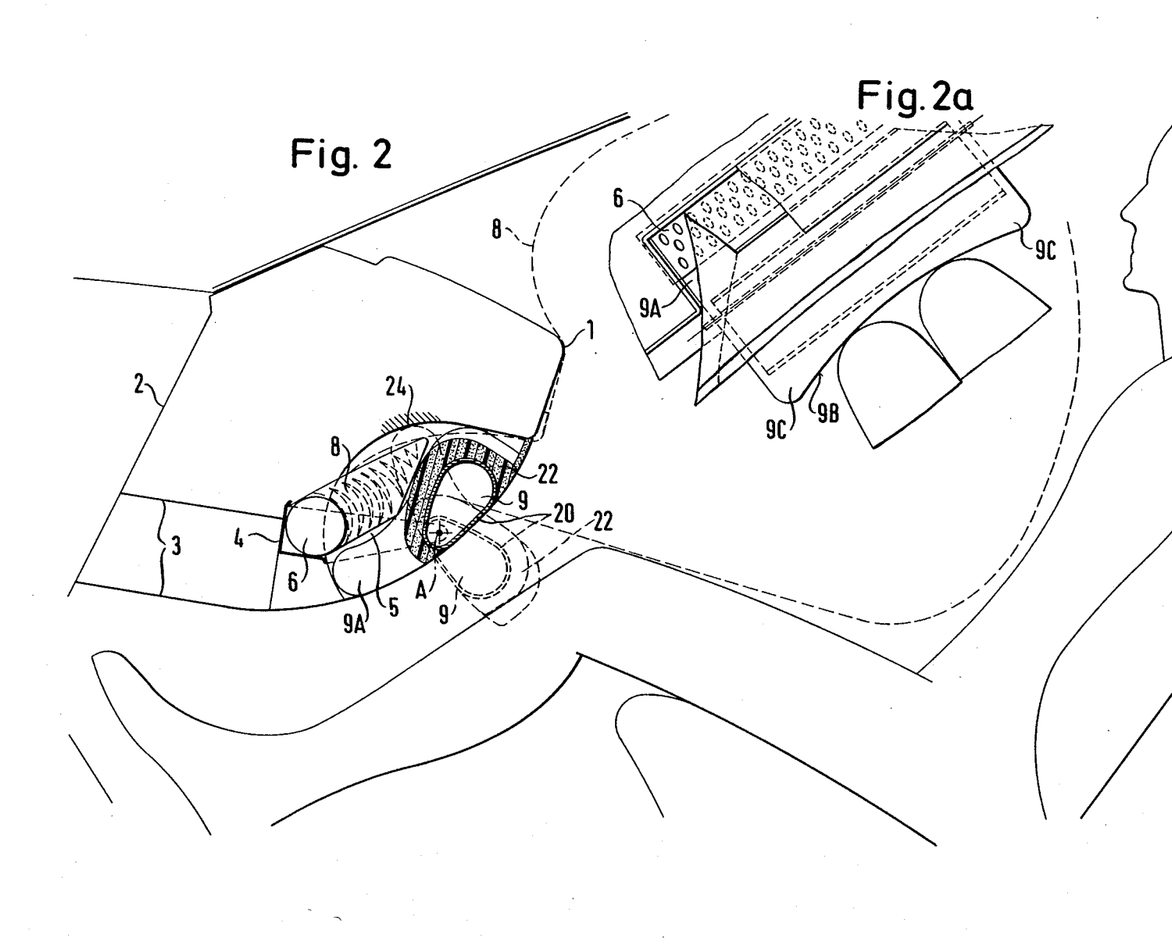

In the embodiment according to FIG. 2 the knee cushion 9 mounted pivotally about the axis A is made elongated in cross-section and has at one side, which is remote from the occupant in the activated position, two lateral cantilever arms 9A. In the rest position the knee cushion 9 forms towards the vehicle occupant part of the lower dashboard covering into which it is thus integrated. The cantilever arms 9A follow the curvature of the lower dashboard covering and form the lower termination thereof. As apparent from FIG. 2a the knee cushion 9 has a concavely curved cushion face 9B on its side facing the occupant (in the activated position). The lateral extensions 9C of this cushion face 9B form a lateral collision protection for the occupant.

The knee cushion 9 is made from a tubular relatively dimensionally stable core 20 and a padding 22 surrounding said core. The choice of material and dimensioning for the core 20 and padding 22 are adapted to the desired deformation behaviour of the knee cushion 9 under load.

The function of the cantilever arms 9A is to ensure a support of the knee cushion 9 in its pivoted-out activated position. The outward pivoting of the knee cushion 9 is limited in that the free ends of the cantilever arms 9A come to bear on the support shell 24 which extends the splashboard base 3 upwardly. The cantilever arms 9A and the support shell 24 must thus have a high dimensional stability so that the knee cushion 9 cannot be pivoted downwardly beyond its activated position.

Up to the supporting of the knee cushion 9 in its activated position the mode of operation of the embodiment according to FIG. 2 is the same as in the embodiment according to FIG. 1.

Figure 3:
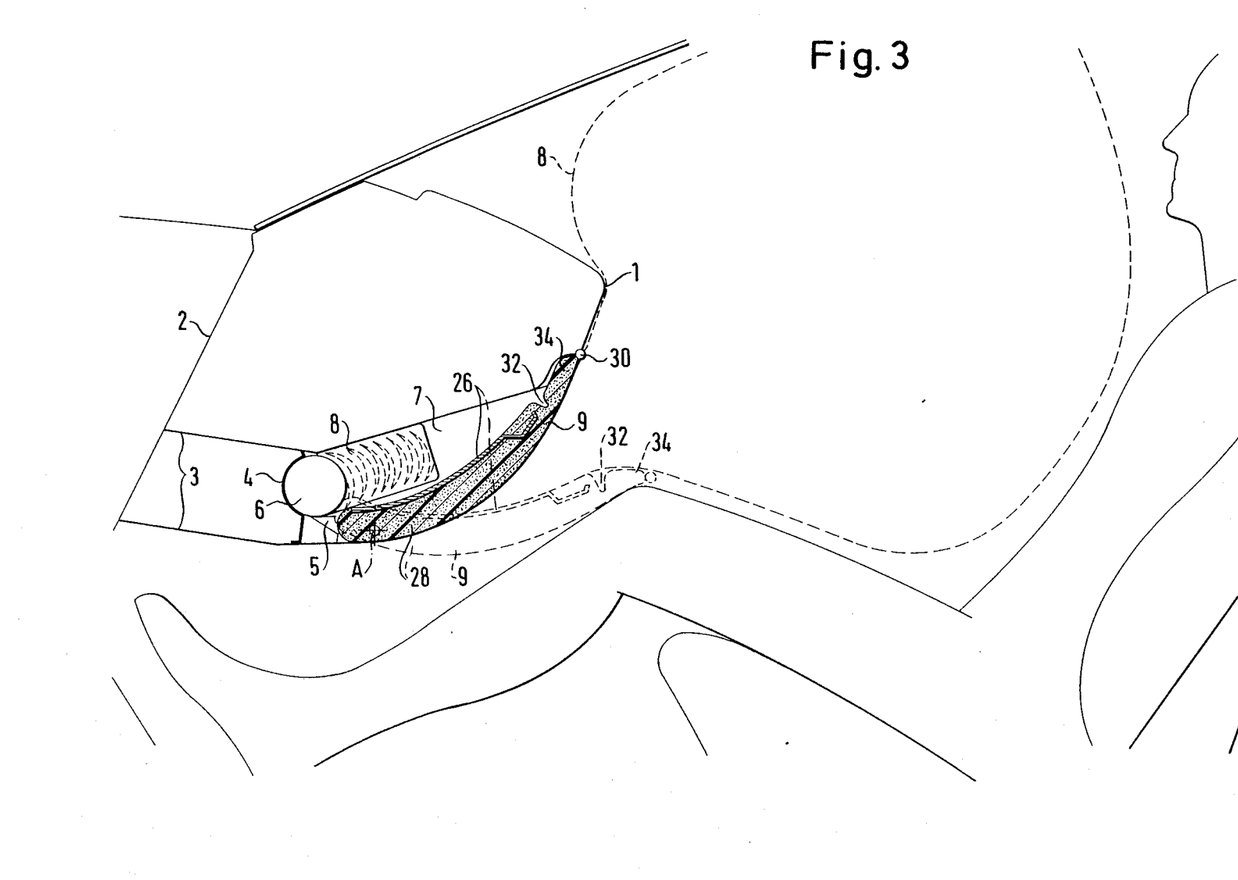
Figure 8:
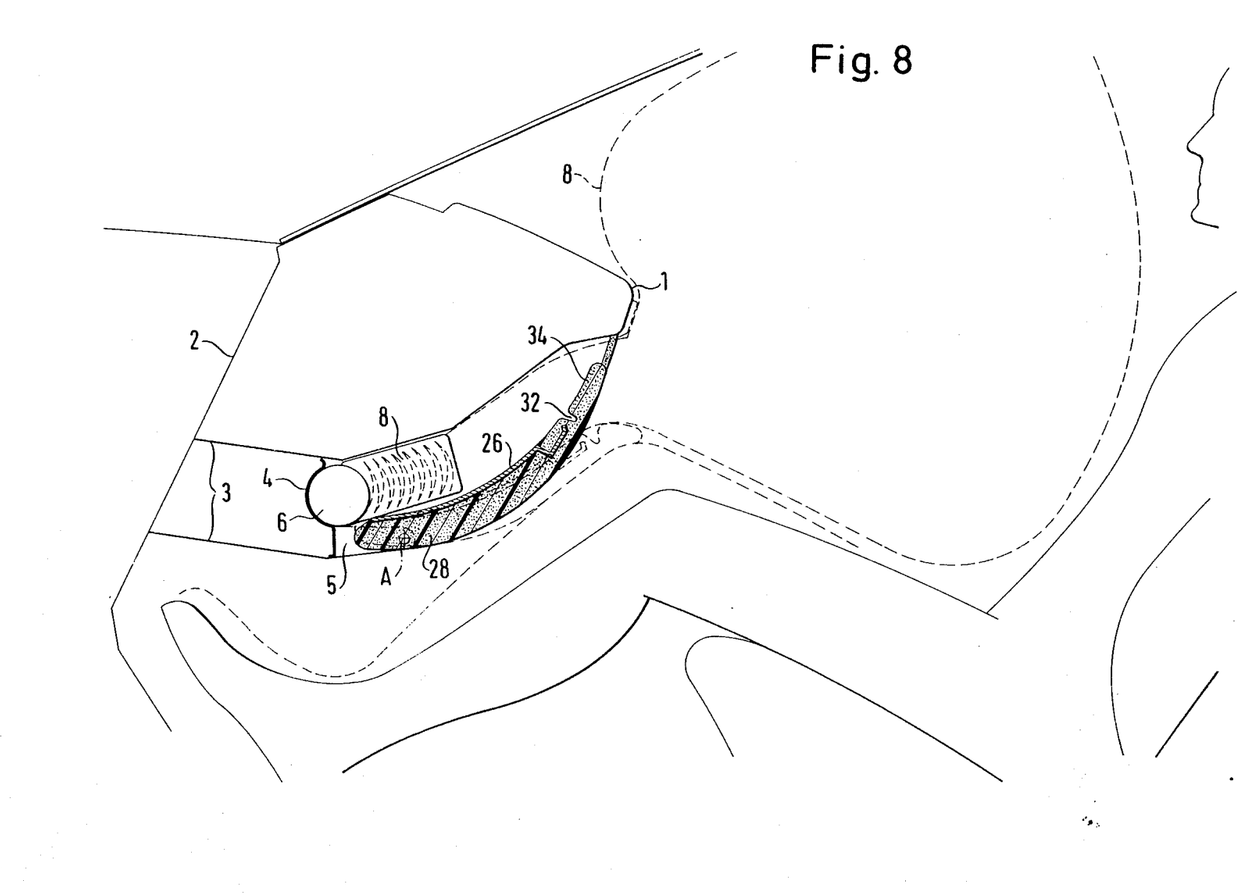

In the embodiment according to FIG. 3 the knee cushion 9 forms a flap which is mounted at its lower end pivotally about the axis A and in its rest position forms part of the lower dashboard covering. The knee cushion 9 consists of a support plate 26 and an externally attached padding 28. The padding 28 is connected at its upper edge via a tear edge 30 to the part of the dashboard covering lying thereabove. The upper edge region of the padding 28 forms a lobe 34 connected via a desired breakage point 32. On activation of the gas generator 6 and commencement of the expansion of the gas bag 8 the knee cushion 9 is subjected to the expansion pressure of the gas bag 8, whereupon the lobe 34 at the tear edge 30 detaches itself from the upper dashboard covering and the knee cushion 9 is forced by the further expanding gas bag 8 into its activated position. This activated position is limited by bearing on the knees of the vehicle occupant. The illustration in FIG. 3 assumes a vehicle occupant of medium size. Depending on the size of the vehicle occupant and the seat position set the distance between the knees of the vehicle occupant and the knee cushion 9 may be considerably smaller than assumed in FIG. 3. For example, in the illustration shown in FIG. 8 it is assumed that the knees of the vehicle occupant even in the rest position of the knee cushion almost bear on the latter. The pivot travel of the flap-like knee cushion 9 is then correspondingly restricted. Nevertheless, the gas bag 8 can emerge unrestrictedly from the stowing space 7 because the lobe 34 separated via the desired breakage point 32 is bent outwardly by the expansion pressure of the gas bag 8, the desired breakage point 32 yielding and on further bending of the lobe 34 an emergency exit for the gas bag 8 is opened. FIG. 8 shows this operation in an embodiment only slightly modified compared with FIG. 3.

Figure 4:
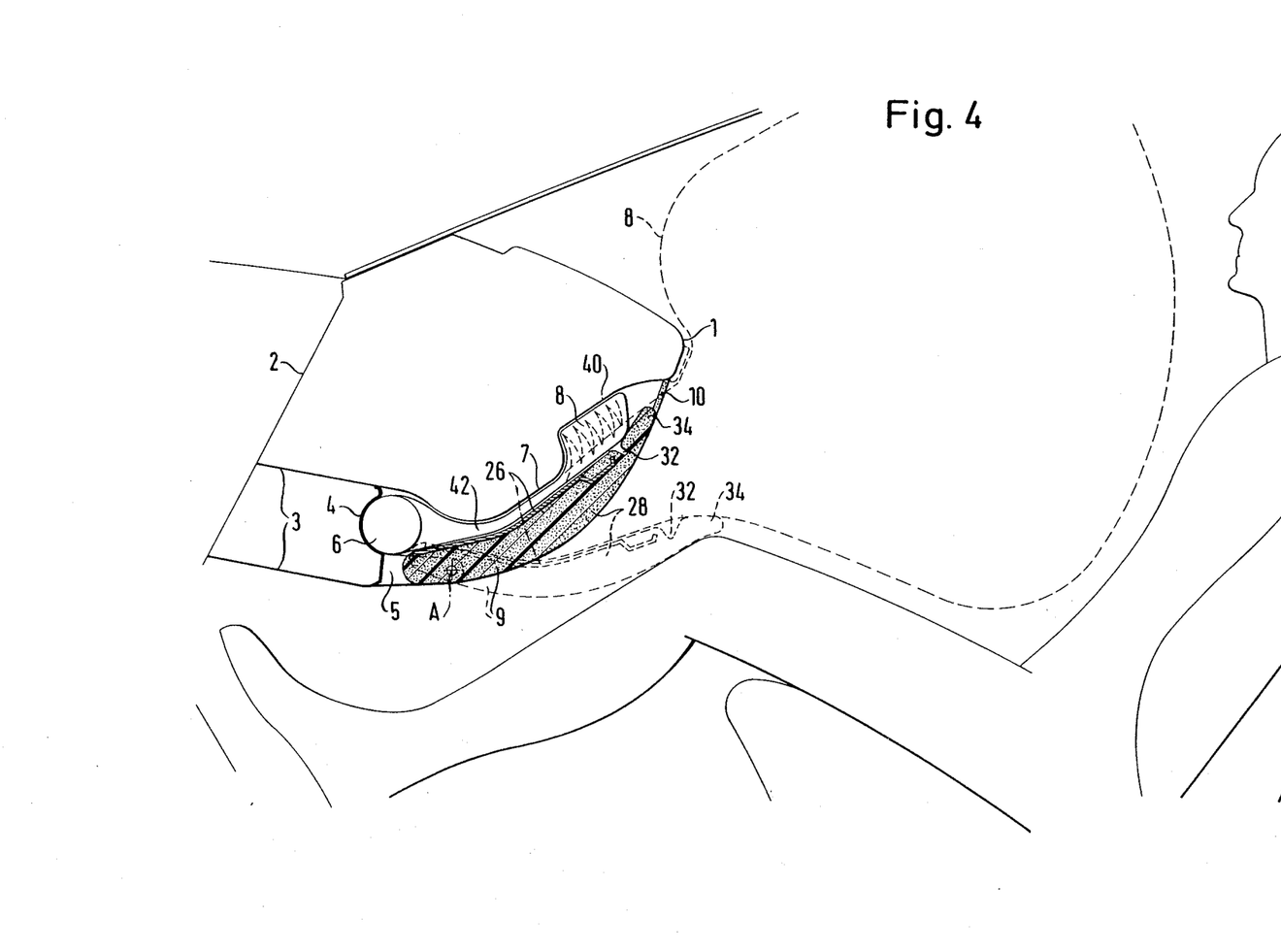

The embodiment of FIG. 4 is also only slightly modified compared with that of FIG. 3. The folded gas bag 8 in this case is arranged not directly adjacent the gas generator 6 but in the region of the upper edge of the knee cushion 9 in a hollow 40 of the stowing space 7 and connected via a flexible tube 42 to the gas generator 6. Said hose or flexible tube 42 is laid along the inner surface of the support plate 26 from the gas generator 6 up to the hollow 40 of the stowing chamber 7. On activation of the gas generator 6 firstly said flexible tube 42 is subjected to pressure, the expansion pressure acting directly on the support plate 26. With this construction and arrangement of the gas bag 8 in the initial phase of the activation of the system the liberated energy is specifically employed for the drive of the knee cushion for movement into its activated position. This measure achieves an accelerated activation of the knee cushion.

Figure 5:
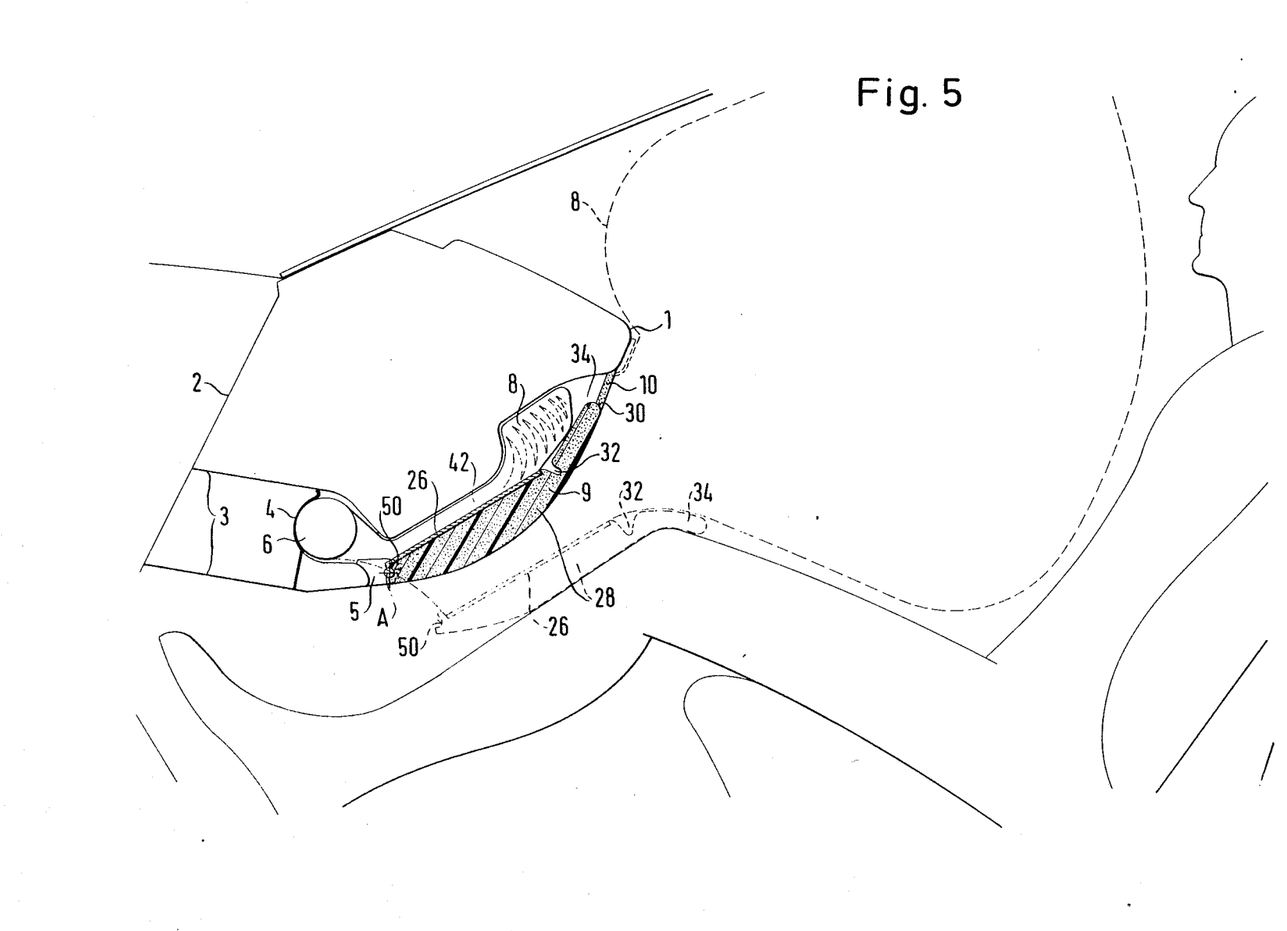

In the embodiment of FIG. 5 the knee cushion 9 is of similar shape to that in FIGS. 3, 4 and 5 but it is pivotally supported at its lower edge on the shaft A in such a manner that it can detach itself from said shaft. The support face at the lower edge of the knee cushion 9 is formed by a groove 50 having a cross-sectional form adapted to the diameter of the shaft A. On activation of the system the knee cushion 9 first executes a pivot movement about the axis A, behaving like a pivotal flap. When the upper edge of the lobe 34 has detached itself along the tear edge 30 the exit for the gas bag 8 is freed so that the latter can further expand. On further expansion of the gas bag 8 the knee cushion 9 detaches itself from the shaft A and is now moved by a translational displacement towards the vehicle occupant. The knee cushion 9 thus moves into a position in which its surface is aligned approximately parallel to the legs of the vehicle occupant. It forms a support surface which extends from the knee far down into the region of the shin. The embodiment according to FIG. 6 differs from that of FIG. 3 in the use of an auxiliary gas bag 60 which is arranged laterally adjacent the gas bag 8 and the function of which is to press the knee cushion 9 into its activated position and hold it therein. The tubular gas generator 6 comprises a laterally attached auxiliary generator part 6A to which the auxiliary gas bag 60 is connected. On activation of the gas generator 6 the auxiliary gas generator 6A is also fired. The gases generated thereby act on the auxiliary gas bag 60 with a pressure $p_2$ which is considerably greater than the pressure $p_1$ in the gas bag 8. By using two gas bags adapted to be subjected to different pressures it is possible to optimize the response behaviour of the knee cushion on activation of the system and the forces retaining the knee cushion in its activated position. Also, the pressure decrease in the auxiliary gas bag 60 can be delayed by suitable material selection and constructional steps so that the activated state of the knee cushion is maintained for a longer period of time.

Figures 6, 6A:
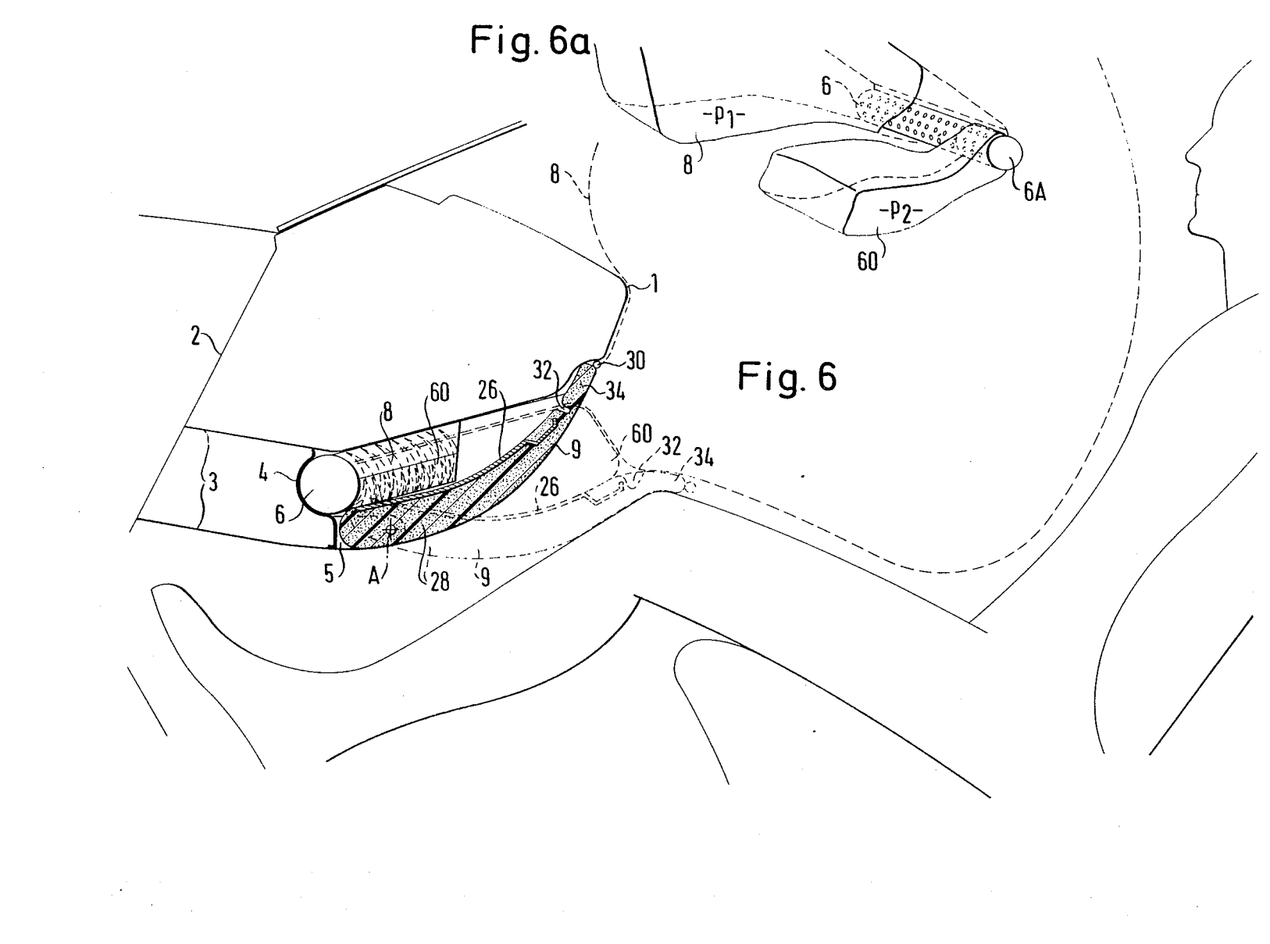

In the embodiment shown in FIG. 6 the knee cushion 9 is constructed as pivotal flap. The use of an auxiliary gas bag 60 is however fundamentally possible in all the other embodiments.

Figure 7:
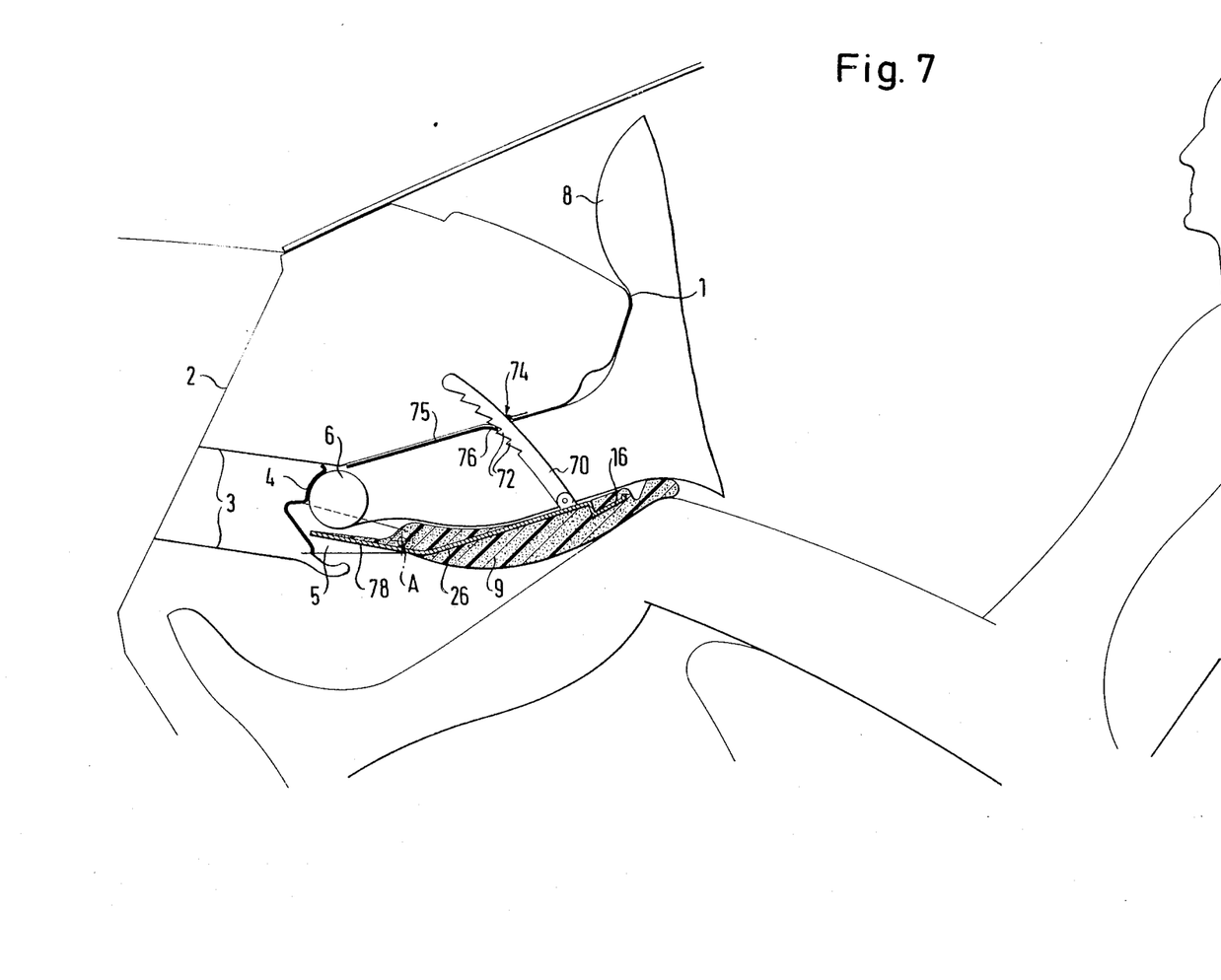

In the embodiment of FIG. 7 the flap-like knee cushion 9 is held by a detent means in its activated position. Said detent means consists of a lever 70 which is articulately connected to the inner side of the support plate 26 and which at its free end comprises a plurality of detent teeth 72 spaced apart from each other in the longitudinal direction. The free end of the lever 70 is introduced through an opening 74 of the splashboard base 3 drawn upwardly to form a support shell 75. At the border of said opening 74 a detent edge 76 cooperating with the detent teeth 72 is formed. Said detent edge 76 engages between two adjacent detent teeth 72 and thus locks the lever 70 in the end position it has reached. The forces exerted by the vehicle occupant on the knee cushion 9 are conducted via the lever 70 and the support shell 75 onto the splashboard base 3. The pivot movement of the knee cushion 9 in the direction of the activated position is limited by a lug 78 which extends the knee cushion 9 downwardly beyond the axis A and comes to bear on the metal support plate 4 or gas generator 6 before the free end of the lever 70 has moved out of the opening 74. Moreover, on deformation of the knee support 9 and its mounting under load the lug 78 can conduct forces directly via the metal support plate 4 to the splashboard base 3.

Figures 9, 9A:
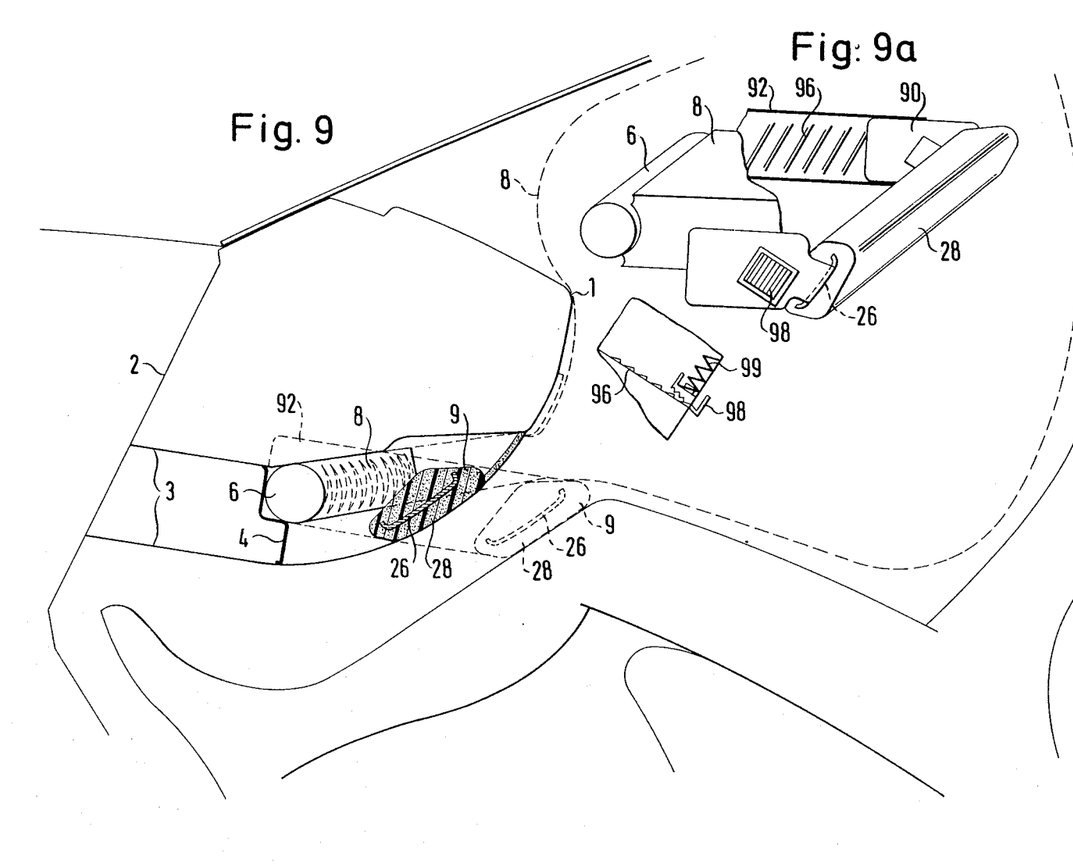
Figure 10:
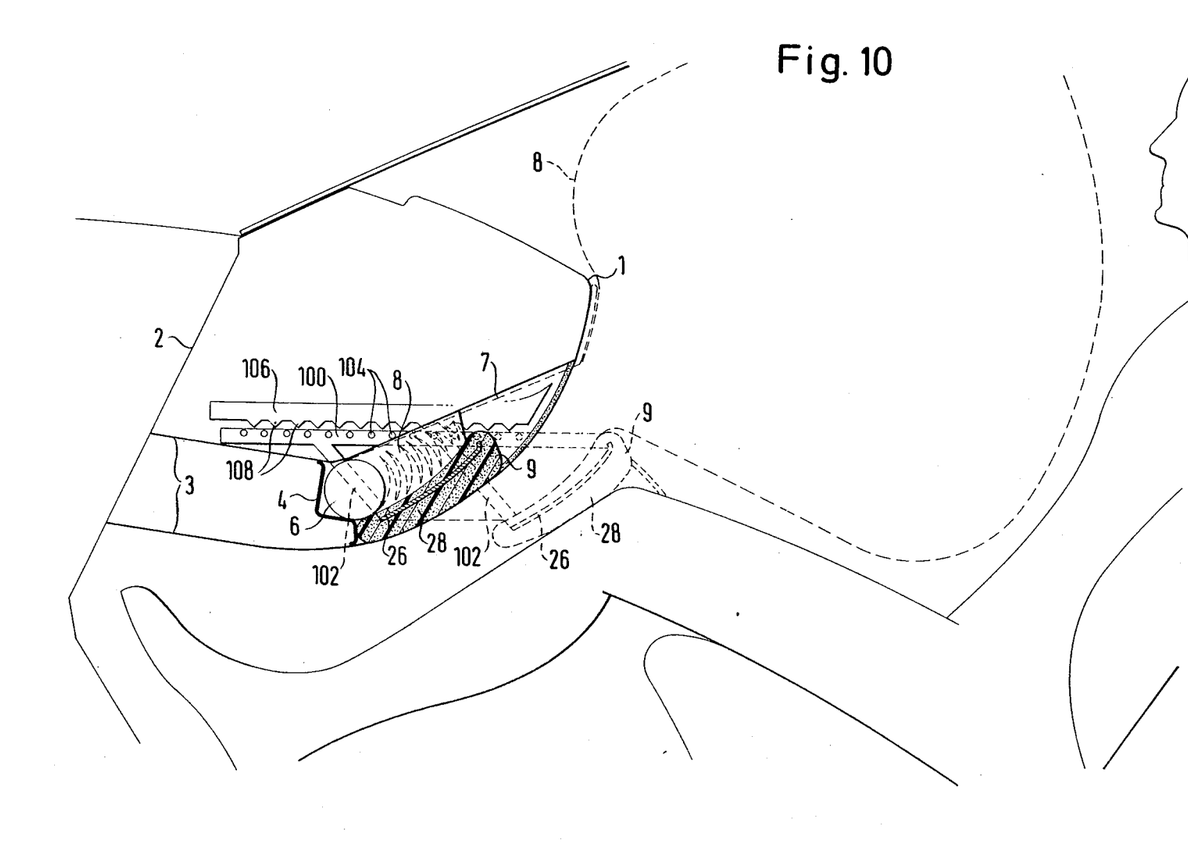

In the embodiments according to FIGS. 9 and 10 as well the knee cushion can also be locked in its activated position. In the embodiment of FIG. 9 the knee cushion 9 consists of a support plate 26 and a padding 28 surrounding said plate. The support plate 26 is connected at each of its two lateral ends to a lateral guide plate 90 which extends forwardly (in the direction of travel) at a right-angle to the support plate 26. The knee cushion 9 forms with its two parallel lateral guide plates 90 a knee interception structure which is U-shaped in plan view. Said lateral guide plates 90 cooperate with lateral guide parts 92 which are U-shaped in cross-section and are mounted on the vehicle bodywork spaced apart from each other with their inner sides facing each other. Between its rest position in which it is integrated into the lower dashboard covering and its activated position the knee cushion 9 executes a guided translational movement. This movement is directed towards the vehicle occupant at a slight angle of a few degrees with respect to the horizontal downwardly. The guide means and the outer contour of the knee cushion 9, which follows the contour of the lower dashboard covering, are adapted to each other in such a manner that in the activated position of the knee cushion 9 the outer contour thereof is aligned approximately parallel to the transition region between the knee and shin of the vehicle occupant to ensure as uniform as possible a pressure distribution over as large as possible a support area. The lateral guide parts 92 are provided at their face facing the corresponding lateral guide plate 90 with a plurality of detent teeth 96. Said detent teeth 96 are spaced apart at regular intervals from each other in the longitudinal direction of the lateral guide parts 92 and extend at least approximately parallel to the outer surface of the padding 28 facing the vehicle occupant, i.e. perpendicularly to the expected direction of load. Each lateral guide plate 90 comprises a locking pawl 98 on its outer face facing the lateral guide part 92. The locking pawl 98 is made to fit the detent teeth 96 and pressed by a pressure spring 99 into engagement with said detent teeth 96. The edges of the detent teeth 96 lying at the front in the direction of travel form deflection ramps which press the locking pawl 98 on movement of the knee cushion 9 out of the rest position into the activated position out of engagement with the detent teeth 96 but by latch engagement prevent the movement in the opposite direction. The knee cushion 9 thus remains in its activated position after the gas bag 8 has again been relieved of pressure.

In the embodiment according to FIG. 10 the support plate 26 of the knee cushion 9 is connected at each of its sides to a lateral guide rail 100 which extends from the upper edge of the knee cushion 9 in the forward direction (travelling direction). A support triangle is completed by a strut 102 which is connected to the lower edge of the support plate 26 and to the front region of the adjacent lateral guide rail 100. Each lateral guide rail 100 is provided with laterally projecting arresting pins 104 uniformly spaced apart in the longitudinal direction. At a distance of a few millimetres above the arresting pins 104 there is a lateral guide part 106 which is fixedly connected to the vehicle bodywork. On its side facing the arresting pin 104 the lateral guide part 106 carries two sawtooth-like arresting teeth 108, the teeth flanks of which are symmetrical and which are uniformly spaced apart in the longitudinal direction in each case opposite the intermediate space between two arresting pins 104.

On activation of the gas generator 6 by subjecting the gas bag stowed folded up directly in front of the knee cushion 9 to pressure said cushion is pressed under the expansion pressure of the gas bag 8 into its activated position after it has detached itself from the lower dashboard covering. At the same time the outlet for the gas bag 8 is freed and said bag unfolds in usual manner after coming out of the stowing space 7. During the movement of the knee cushion 9 into its activated position the two lateral guide rails 100 effect a parallel guiding in a manner similar to that in the embodiment of FIG. 9. Since the guide rails 100 are however movable upwardly towards the lateral guide part 106 the arresting pins 104 thereof are brought under the action of the load exerted on the knee cushion 9 and directed inclined forwardly and upwardly into engagement with the locking teeth 108 by engaging in force-locking manner into the gaps between said teeth. Since the load is directed inclined forwardly and upwardly the arresting pins 104 are blocked in the gaps between the locking teeth 108. The knee cushion 9 is thus held by force-locking engagement of the arresting pins 104 between the arresting teeth 108 in its activated position.

However, as soon as after an accident the load on the knee cushion 9 is removed said cushion can easily be moved back into its rest position because the teeth flanks of the locking teeth 108 now act as repelling ramps for the arresting pins 104 and press the latter out of the teeth gaps. The knee cushion thus does not obstruct the freeing of the occupant from the damaged vehicle.

In all the examples of embodiment described the gas bag knee cushion restraining system is preferably supplied as complete component assembly and installed into a suitably prepared accommodation space in the lower region of the dashboard covering.

Figure 11:
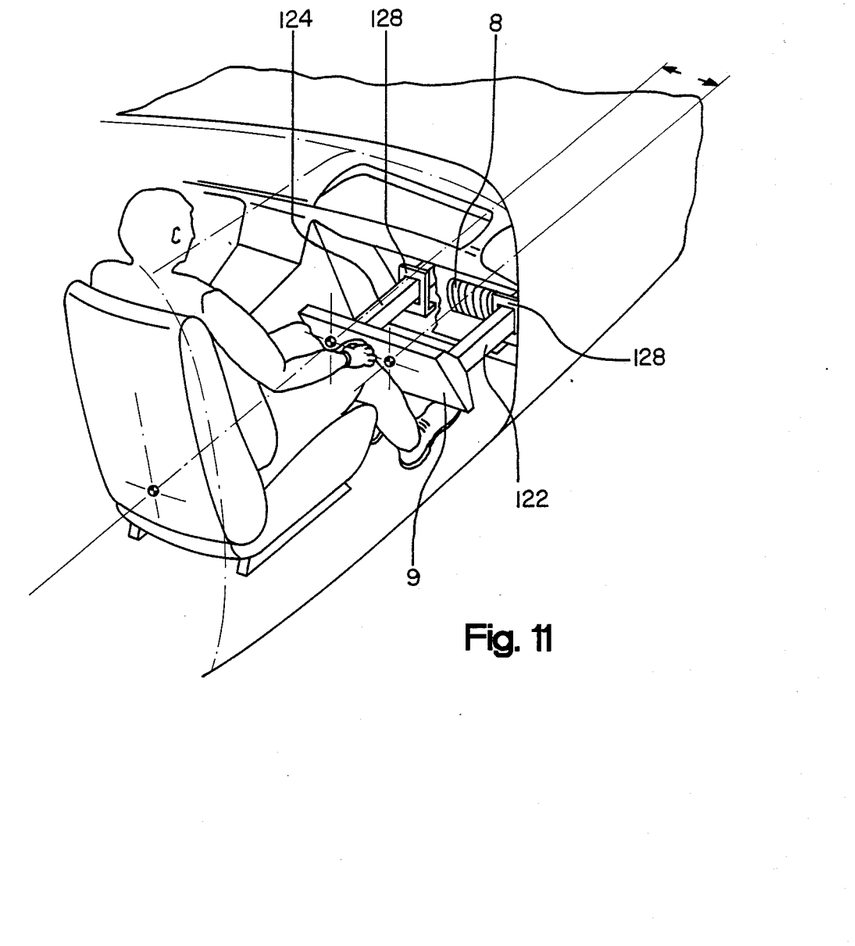

In the embodiment shown in FIG. 11 a knee cushion is secured by means of a stiffening transverse strut 120 (FIG. 12) to the two free ends of two parallel guide tubes 122, 124 which extend in the longitudinal direction of the vehicle. Each of the guide tubes 122, 124 is in turn guided telescopically displaceably in a corresponding opening 126 (FIG. 12) of a guide member 128 secured to the vehicle bodywork. As apparent from FIG. 11 the vertical centre plane of the knee cushion 9 parallel to the longitudinal direction of the vehicle is offset laterally and outwardly with respect to the vehicle from the corresponding vertical centre plane of the associated vehicle seat.

FIG. 11 shows the knee cushion 9 in the activated position brought up to the knee of the vehicle occupant. The knee cushion 9 comes into this position under the action of the expansion pressure of a gas bag 8 which is shown in the folded state in FIG. 11 only for better clarity. In this folded state the gas bag 8 is received in a stowing space which lies between the two guide members 128.

Figure 12:
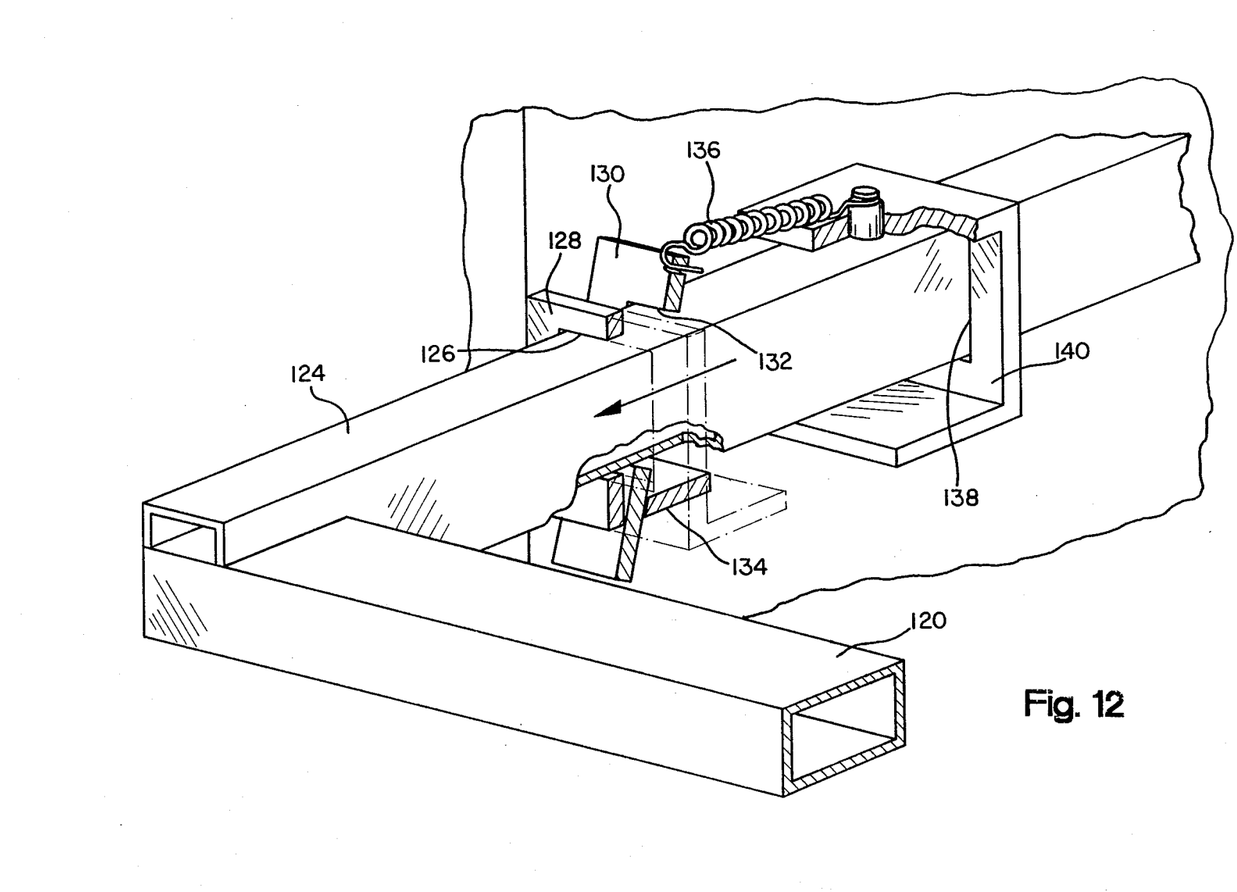

In the activated position shown in FIG. 11 the knee cushion 9 is locked by the mechanism shown in FIG. 12. Said mechanism includes a blocking plate 130 which has a passage opening 132 for said guide tube 124 which is adapted to the cross-sectional form of the guide tube 124 and the height of which is however somewhat greater than the corresponding dimension of the guide tube 124 of rectangular cross-section. The blocking plate 130 is pivotally mounted in the region of its lower end in a gap formed between the guide member 128 and an abutment 134. A tension spring 136 is engaged with its one end in the blocking plate 130 and its other end in a further guide member 140 for the guide tube 124 secured to the vehicle bodywork and having a guide opening 138. At its edge adjacent the tension spring 136 the passage opening 132 has a blocking edge which engages the adjacent surface of the guide tube 124. By the action of the tension spring 136 the blocking plate 130 is held in a pivot position forwardly inclined with respect to the normal direction of travel. On a thrust movement of the guide tube 124 in the direction towards the vehicle occupant (arrow in FIG. 12) the blocking plate 130 is frictionally entrained so that it uprights itself slightly against the force of the tension spring 136 and frees the movement of the guide tube 124. On movement of the guide tube 124 in the opposite direction, i.e. out of the activated position of the knee cushion 9 in the direction into its rest position, the blocking plate 130 is however tilted to block the further movement of the guide tube 124. The forces arising by impact of the vehicle occupant on the knee cushion 9 are introduced via the guide tube 124 and the lower end of the blocking plate 130 into the abutment 134. It is obvious that a corresponding detent mechanism is associated with the guide tube 122 not shown in FIG. 12. This detent mechanism is distinguished in that it permits an infinitely variable locking which can however be released when desired.

What is claimed is:

1. A gas bag knee cushion restraining system for motor vehicles having a gas bag inflatable by a gas generator, a knee cushion mounted in a lower region of the vehicle dashboard and activating means for activating said gas generator in an emergency situation to develop gas for inflating said gas bag, wherein said knee cushion is mounted movable between a retracted rest position and an activated position advanced towards the knees of a vehicle occupant, said gas developed by said gas generator, when activated, producing an expansion pressure a portion of which is used to drive said knee cushion from its rest position to its activated position, said knee cushion being lockable in its activated position by force-locking elements which are formed on each side of said knee cushion on two lateral guide elements which are arranged spaced apart from each other and above each other and of which a first one is supported on the vehicle bodywork and a second one is connected to said knee cushion, said force-locking elements being formed on said first lateral guide element by teeth spaced apart longitudinally thereof and having teeth flanks which form repelling ramps for the force-locking elements of said second lateral guide element, said lateral guide element under the action of the load acting in the event of activation on said knee cushion and directed inclined upwardly in the direction of travel being moved into mechanical interlock with each other, but when the load is removed being moved out of engagement with each other under the action of said repelling ramps of said teeth.

2. The gas bag knee cushion restraining system according to claim 1, wherein said force-locking elements cooperating with said teeth are formed by arresting studs or pins having a pitch similar to a pitch of said teeth and arranged in the longitudinal direction of the respective lateral guide element on the latter and secured thereto.

3. A gas bag knee cushion restraining system for motor vehicles having a gas bag inflatable by a gas generator, a knee cushion mounted in a lower region of the vehicle dashboard, activating means for activating said gas generator in an emergency situation to develop gas for inflating said gas bag, and a pair of parallel and laterally spaced guide tube members telescopically received in corresponding guide openings of the vehicle and having a free end whereto said knee cushion is attached, said knee cushion being movable by telescopic movement of said guide tube members between a retracted rest position and an activated position advanced towards the knees of a vehicle occupant, said gas developed by said gas generator, when activated, producing an expansion pressure a portion of which is used to drive said knee cushion from its rest position to its activated position, and detent means being associated with said guide tube members to lock said knee cushion in said activated position.

4. The gas bag knee cushion restraining system according to claim 3, wherein said detent means comprises a plate member which is pivotally mounted about an axis transverse to the longitudinal direction of said guide tube members, said plate member having an opening, one of said guide tube members extending through said opening, said plate member being resiliently biased to an inclined pivotal position and said opening having an edge frictionally engaging the outer surface of said guide tube member extending through said opening to block said guide tube member against movement from the activated position of said knee cushion towards said rest position but to enable telescopic movement of said guide tube member from the rest position of said knee cushion to said activated position.

5. The gas bag knee cushion restraining system according to claim 3, wherein said knee cushion has a vertically extending central plane parallel to the longitudinal direction of the vehicle and laterally offset from a parallel central plane of a vehicle seat associated with said knee cushion.

6. A gas bag knee cushion restraining system for motor vehicles having a gas bag inflatable by a gas generator, a knee cushion mounted in a lower region of the vehicle dashboard and activating means for activating said gas generator in an emergency situation to develop gas for inflating said gas bag, wherein said knee cushion is mounted movable between a retracted rest position and an activated position advanced towards the knees of a vehicle occupant, said gas developed by said gas generator, when activated, producing an expansion pressure a portion of which is used to drive said knee cushion from its rest position to its activated position, said knee cushion being lockable in its activated position by a detent means.

7. The gas bag knee cushion restraining system according to claim 6, wherein said detent means are formed by detent elements which cooperate with each other and are guided relatively to each other, at least one of said detent elements being supported on the vehicle bodywork and another of said detent elements being connected to said knee cushion.

8. The gas bag knee cushion restraining system according to claim 7, wherein said detent element connected to said knee cushion is formed by at least one lever which is articulately connected to the knee cushion and which at its free end comprises a row of detent teeth which are spaced apart in the longitudinal direction of the lever and which cooperate with a detent edge which forms said other detent element and which is formed at a guide opening in a support wall fixed with respect to the vehicle bodywork.

9. The gas bag knee cushion restraining system according to claim 7, wherein said detent elements are formed on oppositely disposed lateral guide faces of said knee cushion on the one hand and of a lateral guide part fixed with respect to the vehicle bodywork on the other hand.

10. The gas bag knee cushion restraining system according to claim 6, wherein said detent means produce a locking effect which is releasable, and said knee cushion after release of the locking can be moved back into a position at least close to its rest position.

11. A gas bag knee cushion restraining system for motor vehicles having a gas bag inflatable by a gas generator, a knee cushion mounted in a lower region of the vehicle dashboard and activating means for activating said gas generator in an emergency situation to develop gas for inflating said gas bag, wherein said knee cushion is mounted movably between a retracted rest position and an activated position advanced towards the knees of a vehicle occupant, said gas developed by said gas generator, when activated, producing an expansion pressure a portion of which is used to drive said knee cushion from its rest position to its activated position, said knee cushion being pivotally mounted about a shaft which is supported on a support member fixed with respect to the vehicle bodywork.

12. The gas bag knee cushion restraining system according to claim 11, wherein said knee cushion is accommodated in its rest position in a stowing space which is covered by a portion of a lower dashboard covering, said lower dashboard covering being provided with a tear edge.

13. The gas bag knee cushion restraining system according to claim 11, wherein said knee cushion is formed as a flap which covers a stowing space for the folded gas bag and forms a lower part of a lower dashboard covering which is connected via a tear edge to an adjacent upper part of the dashboard covering.

14. The gas bag knee cushion restraining system according to claim 11, wherein said knee cushion is lockable in its activated position by pivoting into an over-center position.

15. The gas bag knee cushion restraining system according to claim 11, wherein said knee cushion is provided with at least one cantilever arm which in the activated position of the knee cushion bears on a part fixed with respect to the vehicle bodywork and limits pivotal movement of said knee cushion towards its activated position.

16. The gas bag knee cushion restraining system according to claim 11, wherein said knee cushion comprises lateral extensions which in the activated position of the knee cushion form a lateral collision protection for the vehicle occupant.

17. A gas bag knee cushion restraining system for motor vehicles having a gas bag inflatable by a gas generator, a knee cushion mounted in a lower region of the vehicle dashboard and activating means for activating said gas generator in an emergency situation to develop gas for inflating said gas bag, wherein said knee cushion is mounted movably between a retracted rest position and an activated position advanced towards the knees of a vehicle occupant, said gas developed by said gas generator, when activated, producing an expansion pressure a portion of which is used to drive said knee cushion from its rest position to its activated position, said knee cushion being formed by a plate which is integrated at least partially flush into a lower portion of the vehicle dashboard covering and connected to said portion via a tear edge.

18. A gas bag knee cushion restraining system for motor vehicles having a gas bag inflatable by a gas generator, a knee cushion mounted in a lower region of the vehicle dashboard and activating means for activating said gas generator in an emergency situation to develop gas for inflating said gas bag, wherein said knee cushion is mounted movably between a retracted rest position and an activated position advanced towards the knees of a vehicle occupant, said gas developed by said gas generator, when activated, producing an expansion pressure a portion of which is used to drive said knee cushion from its rest position to its activated position, said gas bag and said gas generator being accommodated in a stowing space which on its front side remote from a vehicle occupant is closed by a support wall mounted on the vehicle bodywork and on its side facing the vehicle occupant is closed by a tearable cover which is integrated into the vehicle dashboard covering and forms at least part of said knee cushion.

19. The gas bag knee cushion restraining system according to claim 18, wherein said cover is provided adjacent its upper edge with a breakage line running parallel to said edge.

20. A gas bag knee cushion restraining system for motor vehicles having a gas bag inflatable by a gas generator, a knee cushion mounted in a lower region of the vehicle dashboard and activating means for activating said gas generator in an emergency situation to develop gas for inflating said gas bag, wherein said knee cushion is mounted movably between a retracted rest position and an activated position advanced towards the knees of a vehicle occupant, said gas developed by said gas generator, when activated, producing an expansion pressure a portion of which is used to drive said knee cushion from its rest position to its activated position, said gas bag having an at least approximately hose-like portion which in the activated state lies between a support wall on the vehicle bodywork and said knee cushion, said hose like portion, when inflated, urging said knee cushion into its activated position.

21. A gas bag knee cushion restraining system for motor vehicles having a gas bag inflatable by a gas generator, a knee cushion mounted in a lower region of the vehicle dashboard and activating means for activating said gas generator in an emergency situation to develop gas for inflating said gas bag, wherein said knee cushion is mounted movably between a retracted rest position and an activated position advanced towards the knees of a vehicle occupant, said gas developed by said gas generator, when activated, producing an expansion pressure a portion of which is used to drive said knee cushion from its rest position to its activated position, and wherein an auxiliary gas bag is provided which is connected to said gas generator to be inflatable by the gases generated by said gas generator to assume an activated state between a support wall on the vehicle bodywork and said knee cushion, said auxiliary gas bag, when activated, urging said knee cushion into its activated position.

22. The gas bag knee cushion restraining system according to claim 21, wherein said gas generator comprises a gas generator part separately associated with said auxiliary gas bag.

23. A gas bag knee cushion restraining system for motor vehicles having a gas bag inflatable by a gas generator, a knee cushion mounted in a lower region of the vehicle dashboard and activating means for activating said gas generator in an emergency situation to develop gas for inflating said gas bag, wherein said knee cushion is mounted movably between a retracted rest position and an activated position advanced towards the knees of a vehicle occupant, said gas developed by said gas generator, when activated, producing an expansion pressure a portion of which is used to drive said knee cushion from its rest position to its activated position, and wherein said gas bag, said gas generator and said knee cushion form a component assembly within a housing which is adapted to be installed into a corresponding recess in the lower side of the vehicle dashboard.

* * * * *

UNITED STATES PATENT AND TRADEMARK OFFICE
CERTIFICATE OF CORRECTION

PATENT NO. : 4,948,168

DATED : August 14, 1990

INVENTOR(S) : Heinz-Dieter Adomeit and Roland Brenner

It is certified that error appears in the above-identified patent and that said Letters Patent is hereby corrected as shown below:

Column 9, Line 23, Claim 6, change "movable" to --movably--.

On the front page, in [54], i.e., the title, change "GAS BAG CUSHION KNEE RESTRAINING SYSTEM FOR MOTOR VEHICLES" to read
--GAS BAG KNEE CUSHION RESTRAINING SYSTEM FOR MOTOR VEHICLES--.

Signed and Sealed this

Twenty-seventh Day of August, 1991

Attest:

HARRY F. MANBECK, JR.

Attesting Officer

Commissioner of Patents and Trademarks